Patented Aug. 12, 1947

2,425,367

UNITED STATES PATENT OFFICE 2,425,367

PREPARATION OF POLYNITROPARAFFINS

William I. Denton, Woodbury, Richard B. Bishop, Haddonfield, and Edwin M. Nygaard, Woodbury, N. J., and Thomas T. Noland, Richmond, Ky., assignors to Socony-Vacuum Oil Company, Incorporated, a corporation of New York No Drawing. Application August 30, 1945, Serial No. 613,712

15 Claims. (Cl. 260—644)

This application has to do with a novel process for the preparation of polynitroparaffins from nitroparaffins having a lesser number of nitro groups at elevated temperatures and pressures.

During the past decade considerable progress has been made in the syntheses of nitroparaffins. In the main this progress has primarily been made in the production of mono-nitroparaffins by vapor phase reaction of various alkanes with nitrating agents. This work has been reported in the literature in the several publications of H. B. Haas and his associates at Purdue University and Commercial Solvents Corporation. Little or no progress, however, has been reported on the preparation of polynitroparaffins derived from relatively short chain alkanes, particularly those having from three to five carbon atoms. The present application is directed to a solution to this problem.

More particularly, the present application relates to a process for the preparation of polynitroparaffins having from three to five carbon atoms and characterized by attachment of at least two nitro groups to other than primary carbon atoms. This process involves reaction of a mono- or a poly-nitroparaffin with a nitrating agent at a temperature from about 150° C. to about 250° C. at an elevated pressure, the mono- or poly-nitroparaffin reactant having from three to five carbon atoms, being characterized by attachment of the nitro groups to other than a primary carbon atom and being further characterized by at least one hydrogen atom attached to other than a primary carbon atom. Mono-nitroparaffins used as reactants here are 2-nitropropane, 2-nitrobutane, 2-nitropentane and 3-nitropentane, in all of which the carbon atom to which the nitro group is attached also has attached thereto a secondary hydrogen atom. It will be apparent that 2-nitrobutane contains three secondary hydrogen atoms, and that 2-nitropentane and 3-nitropentane contain five secondary hydrogen atoms. Also coming within the foregoing definition of the mono-nitroparaffin reactant is 2-methyl-3-nitrobutane which has one secondary hydrogen atom. The poly-nitroparaffins which may be used are illustrated by: 2,3-dinitrobutane and 2,2,3-trinitropentane. The poly-nitroparaffin products obtained from the foregoing mono- and poly-nitroparaffin reactants contain at least one more nitro group than the reactants used and are characterized by attachment of the nitro groups to either secondary or tertiary carbon atoms, i. e., by attachment to other than a primary carbon atom.

In the main, the poly-nitroparaffins obtained from the foregoing mono-nitroparaffins are gem-dinitroparaffins; gem-dinitroparaffins are defined as those having two nitro groups attached to the same carbon atom. It follows, therefore, that the gem-dinitroparaffins contemplated herein are those characterized by attachment of the nitro groups to other than a primary carbon atom. In effect, then, the present method provides a means for selectively introducing additional nitro groups into a mono- or poly-nitroparaffin of the foregoing type, selectively introducing such nitro or nitro groups to either a secondary or a tertiary carbon atom, or both. The selectivity of the process is demonstrated by the behavior of 1-nitropropane reacted with a nitrating agent in the present process; no dinitropropane is obtained therefrom, the predominant product being unchanged 1-nitropropane and decomposition products thereof.

Although the present process is desirable for producing poly-nitroparaffins of the aforesaid type, it is particularly desirable for the preparation of 2,2-dinitropropane from 2-nitropropane and a suitable nitrating agent. For this reason, then, the process is described hereafter in detail in terms of the preparation of 2,2-dinitropropane.

The nitrating agents used in the present process include nitric acids, particularly 40 to 70 per cent nitric acids; anhydrous nitric acid; oxides of nitrogen higher than NO, such as $NO_2$, $N_2O_3$, $N_2O_4$, and $N_2O_5$. Mixed acids such as nitric acid and sulfuric acid mixtures, which apparently contain nitrosyl sulfuric acid, may also be used; however, such acids are limited to those in which the sulfuric acid is present in minor proporations. It has been found in this connection that when major proportions of sulfuric acid are present in such mixed acids, the nitroparaffin reactant such as 2-nitropropane is oxidized before it has an opportunity to react with the nitrating agent. Of the foregoing nitrating agents it is preferred that $NO_2$, $N_2O_4$ or nitric acids be used, and of such acids 40 to 70 per cent nitric acids (specific gravity 1.25 to 1.42) are particularly preferred.

In carrying out the present process it has been found desirable, although not essential, to use a diluent such as water, nitrogen, $CO_2$, paraffins such as butane, propane, etc. Particularly desirably is water in the proportions of from about 10 to about 80 mol per cent, based upon the sum of the molar quantities of 2-nitropropane, the nitrating agent and water. Water is a product of the reaction and, therefore, dilution of the nitric acid used is not detrimental in a recycle or continuous process. In this connection it has been found that when 100 per cent nitric acid is used, the conversions of 2-nitropropane to 2,2-dinitropropane, and the yields of the latter, are generally lower than when a more dilute acid is used.

The molar proportions of 2-nitropropane and of the nitrating agent used may be varied considerably. As the molar proportion of nitrating agent, such as nitric acid, is increased larger conversions of 2-nitropropane to 2,2-dinitropropane are obtained. In general it is preferred to use a one to one molar ratio of 2-nitropropane to nitric acid (based on 100 per cent $HNO_3$), although this may be varied considerably to obtain the proper balance of conversion and yield.

One of the most critical factors in the present process is reaction temperature. It has been found that reaction between the 2-nitropropane and the nitrating agent, such as nitric acid, is initiated at about 150° C. and that increasing amounts of 2,2-dinitropropane are obtained with increase of temperature until a maximum is reached in the neighborhood of about 190 to about 230° C. Thereafter, smaller amounts of 2,2-dinitropropane are obtained until above 250° C. explosions are noted and decreased yields result. It should be noted here that when temperatures of the order of 260 to 300° C. are used, violent explosions are encountered and the product obtained at 300° C. is alkaline. Accordingly, temperatures above about 250° C. are to be avoided. The effective temperature range, therefore, is from about 150° C. to about 250° C., with the preferred or optimum range from about 190° C. to about 230° C.

Pressure is another essential consideration in the present process. It has been found that at atmospheric pressure, and the aforesaid temperatures, 2-nitropropane is converted to 2,2-dinitropropane only in very small quantities. When pressures in excess of 150 pounds per square inch, or in excess of about 10 atmospheres, are used substantial conversions occur, with increasing conversions being obtained with increasing pressures. It has been found that pressures in excess of about 300 pounds per square inch are particularly desirable, with optimum pressures in the range of about 900 to about 1,200 pounds per square inch. Generally, the rate of increase of conversion decreases when pressures above about 1,200 pounds per square inch are used.

Space velocity is another factor to be given consideration in this process and is defined herein as the volume of liquid reactants charged per hour per volume of reaction zone. At relatively low pressures, as of the order of 150 to 600 pounds per square inch, a space velocity of about 1 is optimum and small changes in space velocity have a relatively large effect on the conversion. Above 600 pounds per square inch the space velocity may be increased without substantially decreasing the conversion of 2-nitropropane to 2,2-dinitropropane. In general, however, space velocities in excess of about 0.1 are used, but preference is given to those from about 0.5 to about 2.5.

In carrying out this process, it is preferred that the reaction zone used be comprised of or have an inert internal surface. For example, it has been found that an iron reactor promotes, to some extent, the decomposition of the charge materials, thereby decreasing the production of the desired 2,2-dinitropropane. Stainless steel or high nickel steels have been found to be much more desirable especially from the viewpoint of corrosion resistance, although they also exert a small promoting effect upon the decomposition of the charge materials. It has also been found that activated alumina, wood charcoal and various alumina silica synthetic materials promote the decomposition of the charge materials. In view of this relationship, it is preferred to use reactors lined with inert material or the aforesaid stainless steel or high-nickel steels either empty or packed with inert surface materials such as glass beads, porcelain chips, and the like.

The following examples are provided hereinafter in order to further illustrate the present process. The reactor used consists of a ½ inch pipe-size, vertical stainless steel seamless tube 40 inches long, packed with 350 ccs. of glass beads which provide a large contact surface. The reactor tube is immersed in a bath of molten heat transfer salt ($KNO_3$—$NaNO_2$ mixture) for proper temperature control. A 2-nitropropane-nitric acid mixture is displaced by an inert liquid such as a light transformer oil from a stationary charge cylinder by means of a reciprocating pump. The outlet conduit of the charge cylinder connects with a preheater of ¼ inch outside diameter stainless steel tubing. The aforesaid mixture is pumped through the said preheater into the top of the aforesaid reactor tube. The reaction mixture comes in contact with the inert glass beads under suitable reaction conditions and the reaction product obtained therefrom flows to the bottom of the reactor tube to a suitable condenser. Thereafter it is drained from the high pressure system. The liquid and gaseous products obtained thereby are then separated; the 2,2-dinitropropane is separated from the liquid products by steam distillation, or by water washing and distilling the hydrocarbon layer obtained thereby. The unreacted charge materials, 2-nitropropane and nitrating agent such as nitric acid, may then be recycled, with or without fresh 2-nitropropane and/or nitric acid, through the reactor.

*Example I*

2-nitropropane (301 grams; 3.38 mols) and 70 per cent nitric acid (301 grams; equivalent to 3.38 mols of $HNO_3$) were charged to the system described above. The two liquids are miscible and form a single phase, and are introduced into the system together. The reaction conditions employed were: temperature, 200–205° C.; pressure 900 pounds per square inch (gauge); space velocity, 1.0. Recovered from the reaction product were 253 grams of unreacted 2-nitropropane and 25.8 grams of 2,2-dinitropropane. Accordingly, 48.0 grams of 2-nitropropane were consumed. This corresponds to a conversion per pass of 5.7 per cent based on 2-nitropropane, or a yield of 36 per cent, based upon the theoretical yield of 2,2-dinitropropane.

*Example II*

In the nitration unit described above, 154.8 grams (1.74 mols) of 2-nitropropane and an equal quantity of 70 per cent nitric acid (equivalent to 1.74 mols $HNO_3$) were charged under the following reaction conditions: temperature, 200–205° C.; pressure, 900 pounds per square inch (gauge); space velocity, 4.0 plus an additional soaking period of thirty-five minutes which increased the contact time by the latter amount. From the reaction product were obtained 96.4 grams of unreacted 2-nitropropane and 21.9 grams of 2,2-dinitropropane, the consumption of 2,2-dinitropropane was 58.4 grams. Accordingly, the conversion per pass of 2-nitropropane was 9.4 per cent, and the yield of 2,2-dinitropropane was 25.0 per cent of theoretical.

*Example III*

2-nitropropane (110 grams; 1.25 mols) and 70 per cent nitric acid (110 grams; 1.25 mols HNO₃) were charged to the system described above under the following conditions; temperature, 225° C.; pressure, 900 pounds per square inch; space velocity, 1.0. The reaction product obtained contained 19.2 grams of 2,2-dinitropropane, corresponding to a conversion per pass of 11.6 per cent, based on 2-nitropropane charged.

*Example IV*

One mol (90 grams) of 2-nitropropane and one mol of nitric acid (90 grams of 70 per cent HNO₃), charged to the aforesaid system, were reacted under the following conditions: temperature, 200° C.; pressure, 2,400 pounds per square inch; space velocity, 1.0. Contained in the reaction product obtained were 16.6 grams of 2,2-dinitropropane; a conversion per pass of 12.3 per cent based on 2-nitropropane charged.

The poly-nitroparaffins obtained in the present process are valuable as intermediates in the preparation of related materials and form resins with alkali polysulfides. They are also extremely valuable ignition improving agents for Diesel fuels, and this is particularly true of 2,2-dinitropropane.

It is to be understood that this invention is not to be limited by the foregoing illustrative material but is to be broadly construed in the light of the defining language of the appended claims.

We claim:

1. The process for the preparation of a poly-nitroparaffin having from three to five carbon atoms and characterized by attachment of at least two nitro groups to other than primary carbon atoms, which comprises: reacting a nitro-paraffin selected from the group consisting of a mono-nitroparaffin and a poly-nitroparaffin having at least one less nitro group than said first-mentioned poly-nitroparaffin with a nitrating agent at a temperature from about 150° C. to about 250° C. at an elevated pressure in excess of about 150 pounds per square inch, said nitro-paraffin reactant having from three to five carbon atoms, being characterized by attachment of each nitro group to other than a primary carbon atom and being further characterized by at least one hydrogen atom attached to other than a primary carbon atom.

2. The process for the preparation of a di-nitroparaffin having from three to five carbon atoms and characterized by attachment of the two nitro groups to other than primary carbon atoms, which comprises: reacting a mononitro-paraffin with a nitrating agent at a temperature from about 150° C. to about 250° C. at an elevated pressure in excess of about 150 pounds per square inch and with a space velocity in excess of about 0.1, said mononitroparaffin having from three to five carbon atoms, being characterized by attachment of the nitro group to other than a primary carbon atom and being further characterized by at least one hydrogen atom attached to other than a primary carbon atom.

3. The process for the preparation of a gem-dinitroparaffin having from three to five carbon atoms characterized by attachment of the two nitro groups to other than a primary carbon atom, which comprises: reacting a mono-nitro-paraffin with a nitrating agent at a temperature from about 150° C. to about 250° C. at an elevated pressure in excess of about 150 pounds per square inch and with a space velocity in excess of about 0.1, said mono-nitroparaffin having from three to five carbon atoms and being characterized by attachment of the nitro group to a secondary carbon atom.

4. The process for the preparation of 2,2-dinitropropane from 2-nitropropane, which comprises: reacting 2-nitropropane with a nitrating agent at a temperature between about 150° C. and about 250° C. at an elevated pressure in excess of about 150 pounds per square inch and with a space velocity in excess of about 0.1.

5. The process for the preparation of 2,2-dinitropropane from 2-nitropropane, which comprises: reacting 2-nitropropane with a nitrating agent at a temperature between about 190° C. and about 230° C. at an elevated pressure in excess of about 150 pounds per square inch and with a space velocity in excess of about 0.1.

6. The process for the preparation of 2,2-dinitropropane from 2-nitropropane, which comprises: reacting 2-nitropropane with a nitrating agent at a temperature between about 150° C. and about 250° C. at an elevated pressure in excess of about 300 pounds per square inch and with a space velocity in excess of about 0.1.

7. The process for the preparation of 2,2-dinitropropane from 2-nitropropane, which comprises: reacting 2-nitropropane with a nitrating agent at a temperature between about 150° C. and about 250° C. at an elevated pressure in excess of about 150 pounds per square inch and with a space velocity between about 0.5 and about 2.5.

8. The process for the preparation of 2,2-dinitropropane from 2-nitropropane, which comprises: reacting 2-nitropropane with nitric acid at a temperature between about 150° C. and about 250° C. at an elevated pressure in excess of about 150 pounds per square inch and with a space velocity in excess of about 0.1.

9. The process for the preparation of 2,2-dinitropropane from 2-nitropropane, which comprises: reacting 2-nitropropane, with an oxide of nitrogen selected from the group consisting of $NO_2$, $N_2O_3$, $N_2O_4$ and $N_2O_5$, at a temperature between about 150° C. and about 250° C. at an elevated pressure in excess of about 150 pounds per square inch and with a space velocity in excess of about 0.1.

10. The process for the preparation of 2,2-dinitropropane from 2-nitropropane, which comprises: reacting 2-nitropropane with 70 per cent nitric acid at a temperature between about 150° C. and about 250° C. at an elevated pressure in excess of about 150 pounds per square inch and with a space velocity in excess of about 0.1.

11. The process for the preparation of 2,2-dinitropropane from 2-nitropropane, which comprises: reacting 2-nitropropane with a nitrating agent at a temperature between about 150° C. and about 250° C. at an elevated pressure in excess of about 150 pounds per square inch, with a space velocity in excess of about 0.1, and in the presence of a diluent.

12. The process for the preparation of 2,2-dinitropropane from 2-nitropropane, which comprises: reacting 2-nitropropane with a nitrating agent at a temperature between about 150° C. and about 250° C. at an elevated pressure in excess of about 150 pounds per square inch, with a space velocity in excess of about 0.1, and in the presence of from about 10 to about 80 molar per cent of water, based upon the sum of the quantities of 2-nitropropane, nitrating agent and water.

13. The process for the preparation of 2,2-dinitropropane from 2-nitropropane, which comprises: reacting about one molar proportion of 2-nitropropane with one molar proportion of nitric acid at a temperature between about 150° C. and about 250° C. at an elevated pressure in excess of about 150 pounds per square inch and with a space velocity in excess of about 0.1.

14. The process for the preparation of 2,2-dinitropropane from 2-nitropropane, which comprises: reacting about one molar proportion of 2-nitropropane with a quantity of 70 per cent nitric acid containing one molar proportion of nitric acid at about 200° C., a pressure of about 900 pounds per square inch and a space velocity of about 4.

15. The process for the preparation of 2,2-dinitropropane from 2-nitropropane, which comprises: reacting about one molar proportion of 2-nitropropane with a quantity of 70 per cent nitric acid containing one molar proportion of nitric acid at about 225° C., a pressure of about 900 pounds per square inch and a space velocity of about 1.

WILLIAM I. DENTON.
RICHARD B. BISHOP.
EDWIN M. NYGAARD.
THOMAS T. NOLAND.